United States Patent
Seyedi (10) Patent No.: US 12,489,528 B2
(45) Date of Patent: Dec. 2, 2025

(54) BI-DIRECTIONAL OPTICAL COMMUNICATION MODULES AND CABLES

(71) Applicant: NVIDIA CORPORATION, Santa Clara, CA (US)

(72) Inventor: Ashkan Seyedi, Atlanta, GA (US)

(73) Assignee: NVIDIA CORPORATION, Santa Clara, CA (US)

( * ) Notice: Subject to any disclaimer, the term of this patent is extended or adjusted under 35 U.S.C. 154(b) by 254 days.

(21) Appl. No.: 18/088,877

(22) Filed: Dec. 27, 2022

(65) Prior Publication Data
US 2024/0214072 A1    Jun. 27, 2024

(51) Int. Cl.
H04B 10/40    (2013.01)
H04B 10/25    (2013.01)

(52) U.S. Cl.
CPC ....... H04B 10/25891 (2020.05); H04B 10/40 (2013.01)

(58) Field of Classification Search
CPC .......... H04B 10/2589; H04B 10/25891; H04B 10/40; H04B 10/43
See application file for complete search history.

(56) References Cited

U.S. PATENT DOCUMENTS

| | | | |
|---|---|---|---|
| 11,336,374 B1 | 5/2022 | Gridish | |
| 2005/0025486 A1* | 2/2005 | Zhong | H04J 14/0227 398/79 |
| 2005/0025489 A1* | 2/2005 | Aldridge | H04J 14/0216 398/83 |
| 2005/0084262 A1* | 4/2005 | Oberg | H04J 14/0209 398/19 |
| 2013/0322883 A1* | 12/2013 | Dahlfort | H04J 14/021 398/84 |
| 2017/0194310 A1* | 7/2017 | Evans | H01L 24/09 |
| 2020/0204259 A1* | 6/2020 | Son | H04B 10/66 |

* cited by examiner

*Primary Examiner* — Nathan M Cors
(74) *Attorney, Agent, or Firm* — Michael M. McCraw; Moore & Van Allen PLLC (57) ABSTRACT

Apparatuses, devices, modules, cables, and systems are provided for bi-directional optical communication. An example module includes a substrate, a first band pass filter, a first optical transmitter, and a first optical receiver each supported by the substrate. The first optical transmitter is communicably coupled with the first band pass filter and configured to generate optical signals having a first wavelength. The first optical receiver is communicably coupled with the first band pass filter and configured to receive optical signals having a second wavelength. The first band pass filter passes optical signals received from the first optical transmitter having the first wavelength into an optical communication medium and directs optical signals received from the optical communication medium having the second wavelength into the first optical receiver.

20 Claims, 12 Drawing Sheets

BI-DIRECTIONAL OPTICAL COMMUNICATION MODULES AND CABLES

TECHNOLOGICAL FIELD

Example embodiments of the present disclosure relate generally to network communication systems and, more particularly, to modules that provide bi-directional optical communication.

BACKGROUND

Communication networks, systems, channels, and the like are employed in a variety of applications in order to transmit data from one location to another. These networks may leverage a large number of modules, cables, and/or other communication devices to provide these communications. As the size of communication networks increase, the number of associated cables between optical components leveraged by these devices similarly increases. Applicant has identified a number of deficiencies and problems associated with networking systems and associated communications. Through applied effort, ingenuity, and innovation, many of these identified problems have been solved by developing solutions that are included in embodiments of the present disclosure, many examples of which are described in detail herein.

BRIEF SUMMARY

Systems, apparatuses, and methods are disclosed herein for bi-directional optical communication. An example bi-directional optical communication cable may include a first substrate and a first band pass filter supported by the first substrate. A first optical transmitter supported by the first substrate is also provided and communicably coupled with the first band pass filter. The first optical transmitter may be configured to generate optical signals having a first wavelength. A first optical receiver supported by the first substrate may be also provide and communicably coupled with the first band pass filter. The first optical receiver may be configured to receive optical signals having a second wavelength. The components of the first substrate may operate as a first bi-directional optical module.

The bi-directional optical communication cable may further includes a second bi-directional optical module that includes a second substrate and a third band pass filter supported by the second substrate. A second optical transmitter supported by the second substrate may also be provided that may be communicably coupled with the third band pass filter. The second optical transmitter may be configured to generate optical signals having the second wavelength. A second optical receiver supported by the second substrate may also be provided that may be communicably coupled with the third band pass filter. The second optical receiver may be configured to receive optical signals having the first wavelength. The bi-directional optical communication cable may include an optical communication medium communicably coupling the first band pass filter and the third band pass filter.

In some embodiments, the first band pass filter may be configured to pass optical signals received from the first optical transmitter having the first wavelength into the optical communication medium for receipt by the second optical receiver. The first band pass filter may further be configured to direct optical signals received from the optical communication medium and generated by the second optical transmitter having the second wavelength into the first optical receiver.

In some embodiments, the third band pass filter may be configured to pass optical signals received from the second optical transmitter having the second wavelength into the optical communication medium for receipt by the first optical receiver. The third band pass filter may also be configured to direct optical signals received from the optical communication medium and generated by the first optical transmitter having the first wavelength into the second optical receiver.

In some embodiments, the optical signals having the first wavelength and optical signals having the second wavelength may be transmitted simultaneously by the optical communication medium.

In some embodiments, the first band pass filter may further include an input port, and the first optical transmitter may be communicably coupled with the input port of the first band pass filter. The first band pass filter may further include a drop port, a through port, and an add port where the first optical receiver is communicably coupled with the add port of the first band pass filter.

In some embodiments, the third band pass filter may include an input port, and the second optical transmitter may be communicably coupled with the input port of the third band pass filter. The third band pass filter may further include a drop port, a through port, and an add port where the second optical receiver is communicably coupled with the add port of the third band pass filter.

In some embodiments, the first optical transmitter may further include a second band pass filter configured to selectively generate optical signals having the first wavelength.

In some further embodiments, the second band pass filter operating as the first optical transmitter may further include a first wavelength modification element configured to selectively modify a material index of the second band pass filter so as output the optical signals having the first wavelength.

In some embodiments, the second optical transmitter may further include a fourth band pass filter configured to selectively generate optical signals having the second wavelength.

In some further embodiments, the fourth band pass filter operating as the second optical transmitter may further include a second wavelength modification element configured to selectively modify a material index of the fourth band pass filter so as output the optical signals having the second wavelength.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

As described above, communication networks, systems, channels, and the like are employed in a variety of applications in order to transmit data from one location to another. These networks may leverage a large number of modules, cables, and/or other communication devices to provide these communications. By way of example, datacenters and/or high-performance computing clusters may use various optical communication modules that are connected (e.g., communicably coupled) via optical fibers, cables, etc. The routing of fibers in datacenters or high-performance computing clusters, however, is often a large concern as these fibers consume a large footprint, are heavy, and/or are often routed in the physical infrastructure of the building housing these components. This issue is further complicated by the fact that optical interconnects used in these environments often use the same wavelength(s) across the entire optical network. In other words, a duplex pair using the same wavelength for transmission requires a distinct transmitting fiber and a distinct receiving fiber to establish an optical link resulting in additional cabling requirements that are expensive and physically intrusive in implementations where space is limited.

By enabling a non-blocking, interference-free bi-directional optical link that leverages the same optical fiber, the embodiments of the present disclose substantially reduce (e.g., by at least a factor of two) the routing burdens associated with conventional systems. The embodiments of the present concept provide bi-directional optical communication modules and cables that leverage band pass filter(s) to pass/direct optical signals having particular wavelengths. For example, a band pass filter may include an input port that is communicably coupled with a first optical transmitter generating optical signals at a first wavelength. The band pass filter may include an add port that is communicably coupled with a first optical receiver that receives optical signals at a second wavelength. In operation, the first band pass filter may pass optical signals received from the first optical transmitter having the first wavelength into an optical communication medium and direct optical signals received from the optical communication medium having the second wavelength into the first optical receiver. Complementary band pass filters may be used on the opposing side of the communication link to similarly direct optical signals based upon wavelength.

Embodiments of the present disclosure now will be described more fully hereinafter with reference to the accompanying drawings in which some but not all embodiments are shown. Indeed, the present disclosure may be embodied in many different forms and should not be construed as limited to the embodiments set forth herein; rather, these embodiments are provided so that this disclosure will satisfy applicable legal requirements. Like numbers refer to like elements throughout. Furthermore, as would be evident to one of ordinary skill in the art in light of the present disclosure, the terms "substantially" and "approximately" indicate that the referenced element or associated description is accurate to within applicable engineering tolerances.

As used herein, "operatively coupled" may mean that the components are electronically coupled and/or are in electrical communication with one another, or optically coupled and/or are in optical communication with one another. Furthermore, "operatively coupled" may mean that the components may be formed integrally with each other or may be formed separately and coupled together. Furthermore, "operatively coupled" may mean that the components may be directly connected to each other or may be connected to each other with one or more components (e.g., connectors) located between the components that are operatively coupled together. Furthermore, "operatively coupled" may mean that the components are detachable from each other or that they are permanently coupled together.

Example Bi-Directional Optical Communication Modules and Cables

Figure 1:
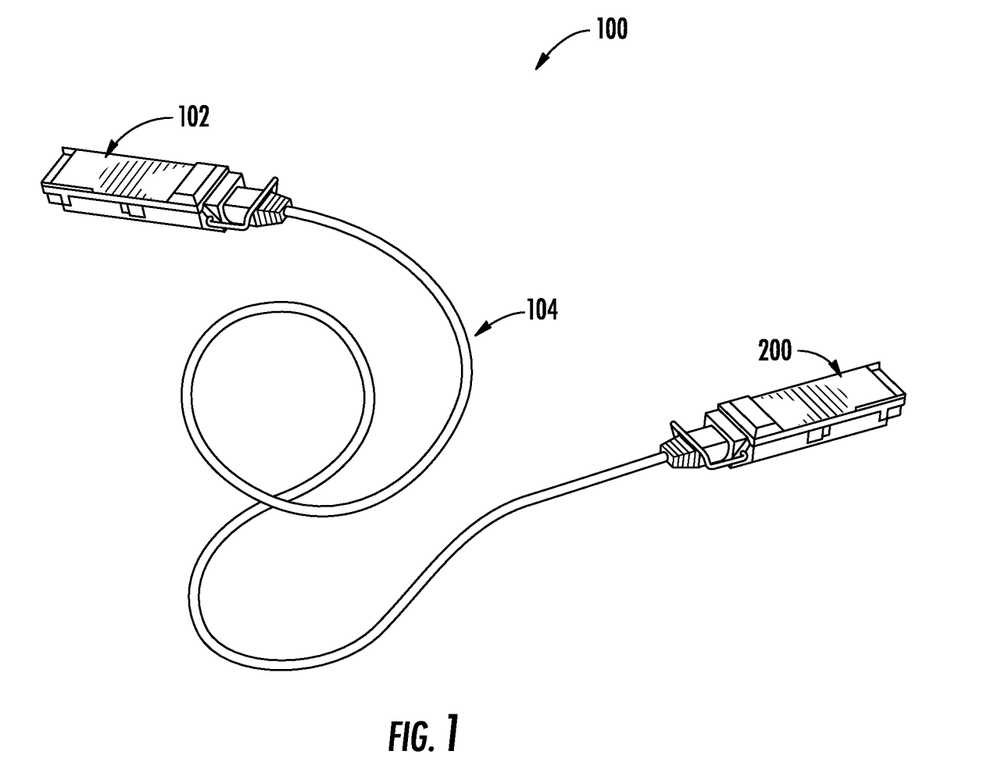
FIG. 1 illustrates an example bi-directional optical communication cable in accordance with one or more embodiments of the present disclosure.

With reference to FIG. 1, an example bi-directional optical communication cable 100 is illustrates in which a first bi-directional optical communication module 102 is communicably coupled with a second bi-directional optical communication module 200 via an optical communication medium 104. As described herein after with reference to FIGS. 2-11, the bi-directional optical communication modules 102, 200 of the present disclosure may include components that generate optical signals (e.g., optical transmitters) having various characteristics (e.g., wavelength or the like) that may be transmitted between the modules 102, 200. As such, the optical communication medium 104 may include any structure configured to support, facilitate, and/or otherwise allow the transmission of optical signals. Said differently, the optical communication medium 104 may be one or more optical fibers, optical cables, and/or the like through which optical signals (e.g., light) may propagate.

The structure of the bi-directional optical communication cable 100 and its components, connections, relationships, and their functions, are provided as examples, and are not meant to limit implementations of the embodiments described. The present disclosure contemplates that the enclosure, housing, etc. that at least partially support the bi-directional optical communication modules 102, 200 may be dimensioned (e.g., sized and shaped) based upon the intended application of the modules 102, 200 and/or of the bi-directional optical communication cable 100. By way of example, the dimensions of the modules 102, 200 may be determined or otherwise defined by application regulations, multi-source agreements (MSAs), or the like such that the overall footprint or formfactor of the modules 102, 200 is subject to these regulations. Furthermore, although described hereinafter with reference to electro-optical components that generate and receive optical signals have a first wavelength (21) or a second wavelength (22), the present disclosure contemplates that any number wavelengths may be used based upon the intended application of the bi-directional optical communication modules 102, 200 and cable 100. Furthermore, the present application contemplates that the number of channels (e.g., the number of optical signals that may be simultaneously transmitted and/or received) by the embodiments described herein may be scaled (e.g., increased) via the additional of additional band pass filters and associated optical transmitters/receivers.

Figure 2:
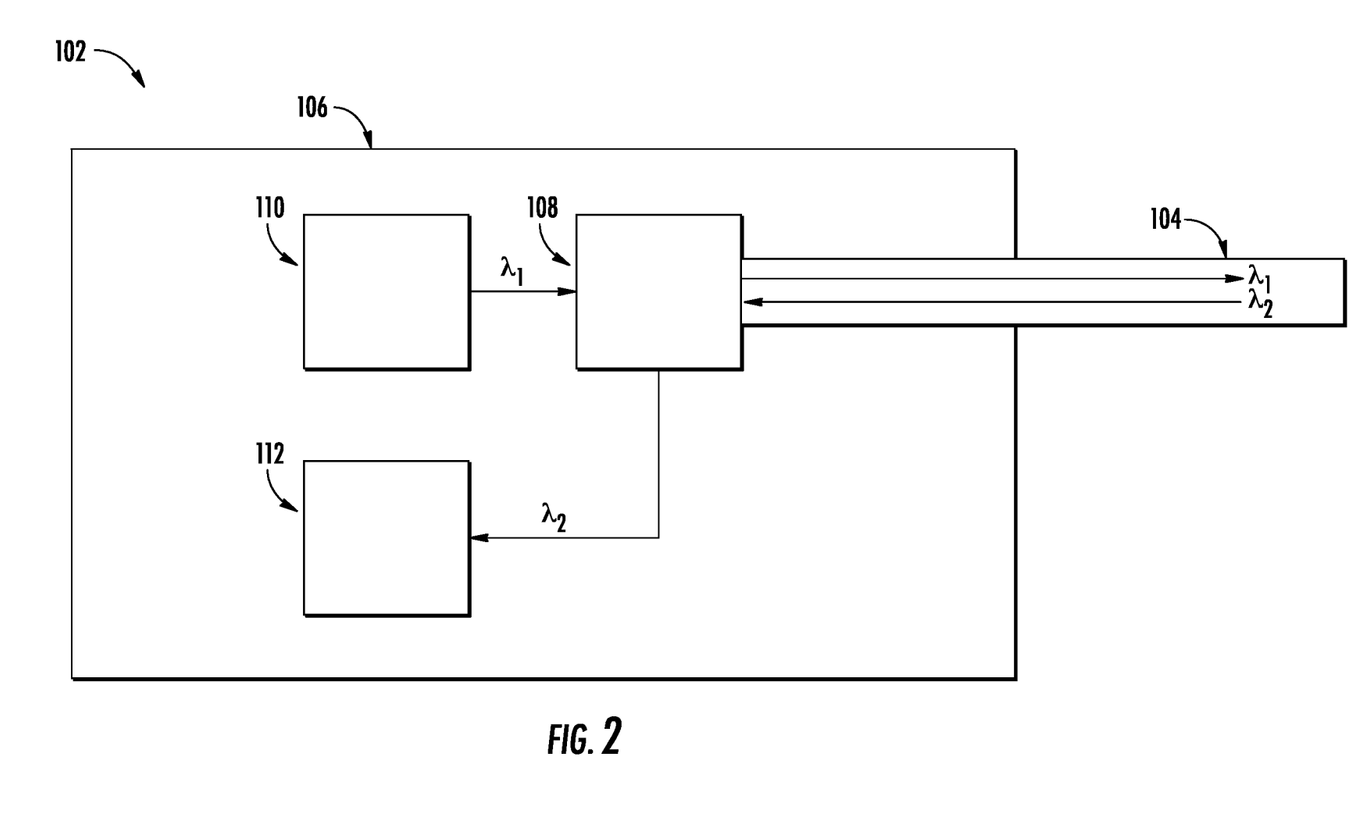
FIG. 2 illustrates an example first bi-directional optical communication module in accordance with one or more embodiments of the present disclosure.

With reference to FIG. 2, an example first bi-directional optical communication module 102 (e.g., module 102) is illustrated. As shown, the first module 102 may include a substrate 106, a first band pass filter 108, a first optical transmitter 110, and a first optical receiver 112 that may each be supported by the substrate 106. The substrate 106 may, for example, be a printed circuit board (PCB) or other equivalent support structure compatible with operation of opto-electronic components. As such, the substrate 106 may define or more electrical traces, wires, etc. configured to establish electrical communication between the opto-electronic components described herein. Although illustrated herein as a generally planar substrate 106, the present disclosure contemplates that the dimensions (e.g., size and/or shape) of the substrate 106 may vary based on the intended application of the module 102 and may, in some embodiments, refer to a plurality of substrates that are, for example, attached so as to collectively support the components described herein.

The first optical transmitter 110 may be supported by the substrate 106 and configured to generate optical signals. As described herein, the first optical transmitter 110 may be configured to generate optical signals having a first wavelength (21) for transmission via the optical communication medium 104 for receipt by a corresponding optical receiver communicably coupled with the optical communication medium 104. In some embodiments, the first optical transmitter 110 may be a vertical-cavity surface-emitting laser (VCSEL) configured to generate optical signals having a first wavelength (2). Although described with reference to a VCSEL based implementation of the first optical transmitter 110, the present disclosure contemplates that any device capable of generating optical signals may be used by the module 102. As described hereinafter with reference to FIG. 6, in some embodiments, the first optical transmitter may include a band pass filter (e.g., a second band pass filter 110) that may be used to selectively generate optical signals. The term "selectively generate" may be used herein to refer to the ability to facilitate generate of optical signals at a particular or selected wavelength via dynamic or active modification of one or more characteristics or parameters of the example band pass filter 110 acting as the first optical transmitter 110.

The first optical receiver 112 may be supported by the substrate 106 and configured to receive optical signals. As described herein, the first optical receiver 112 may be configured to receive optical signals having a second wavelength ($\lambda_2$), such as those received from the optical communication medium 104 that are generated by a corresponding optical transmitter communicably coupled with the optical communication medium 104. In some embodiments, the first optical receiver 112 may be a photodiode configured to receive optical signals having a second wavelength ($\lambda_2$). Although described with reference to a photodiode based implementation of the first optical receiver 112, the present disclosure contemplates that any device capable of receiving optical signals may be used by the module 102.

Figure 3:
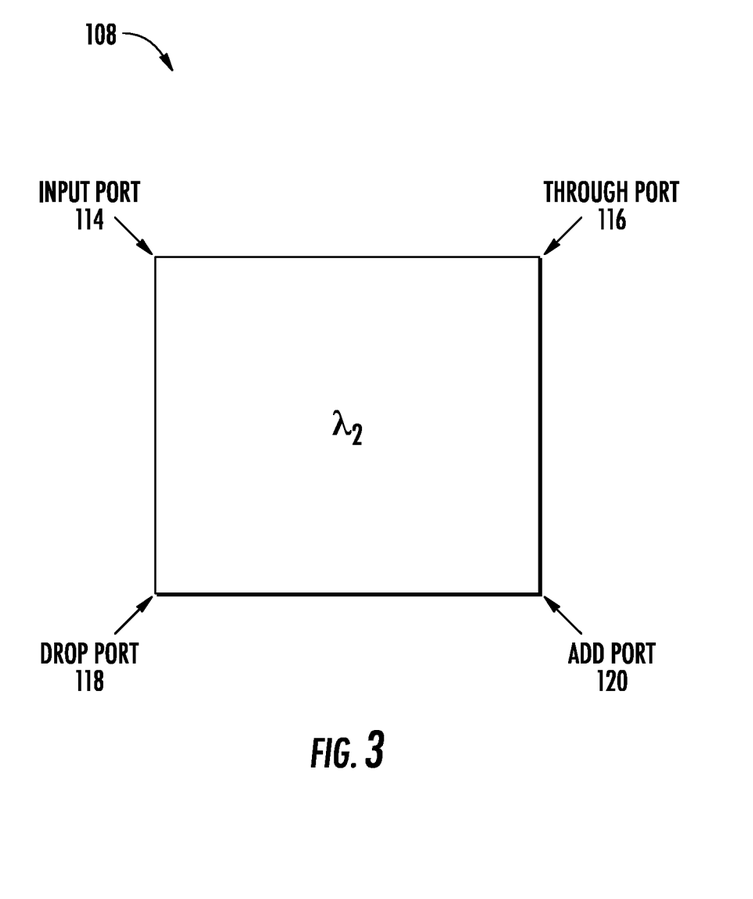
FIG. 3 illustrates an example first band pass filter of the example first bi-directional optical communication module of FIG. 2 in accordance with one or more embodiments of the present disclosure.

With reference to FIG. 3, the first bi-directional optical module 102 (e.g., module 102) may further include a first band pass filter 108, and the first optical transmitter 110 and the first optical receiver 112 may be communicably coupled with the first band pass filter 108. As described more fully hereinafter with reference to FIGS. 4-5, the first band pass filter 108 may be configured to pass optical signals received from the first optical transmitter 110 having the first wavelength ($\lambda_1$) into the optical communication medium 104 and may direct optical signals received from the optical communication medium 104 having the second wavelength ($\lambda_2$) into the first optical receiver 112.

As shown in FIG. 3, the first band pass filter 108 may include an input port 114, a through port 116, a drop port 118, and an add port 120. As would be evident to one of ordinary skill in the art in light of the present disclosure, the relative positioning between these ports 114, 116, 118, and 120 may be defined once any port is determined. Said differently, the input port 114 is disposed opposite the through port 116 and adjacent the drop port 118, and the add port is disposed opposite the drop port 118 and adjacent the through port 116 in any configuration. As a non-limiting example, the first optical transmitter 110 may be communicably coupled with the input port 114 of the first band pass filter 108, the first optical receiver 112 may be communicably coupled with the add port 120 of the first band pass filter 108, and the optical communication medium 104 may be communicably coupled with the through port 116. The first band pass filter 108 may be associated with the second wavelength ($\lambda_2$) in that the first band pass filter 108 is configured to attenuate optical signals having the second wavelength ($\lambda_2$). As would be evident to one of ordinary skill in the art in light of the present disclosure, the first band pass filter 108 may be configured to pass through optical signals having any wavelength other than the second wavelength ($\lambda_2$) while the attenuation of the optical signals having the second wavelength ($\lambda_2$) results in re-direction of the optical signal to the adjacent ports as illustrated in FIGS. 4-5.

Figure 4:
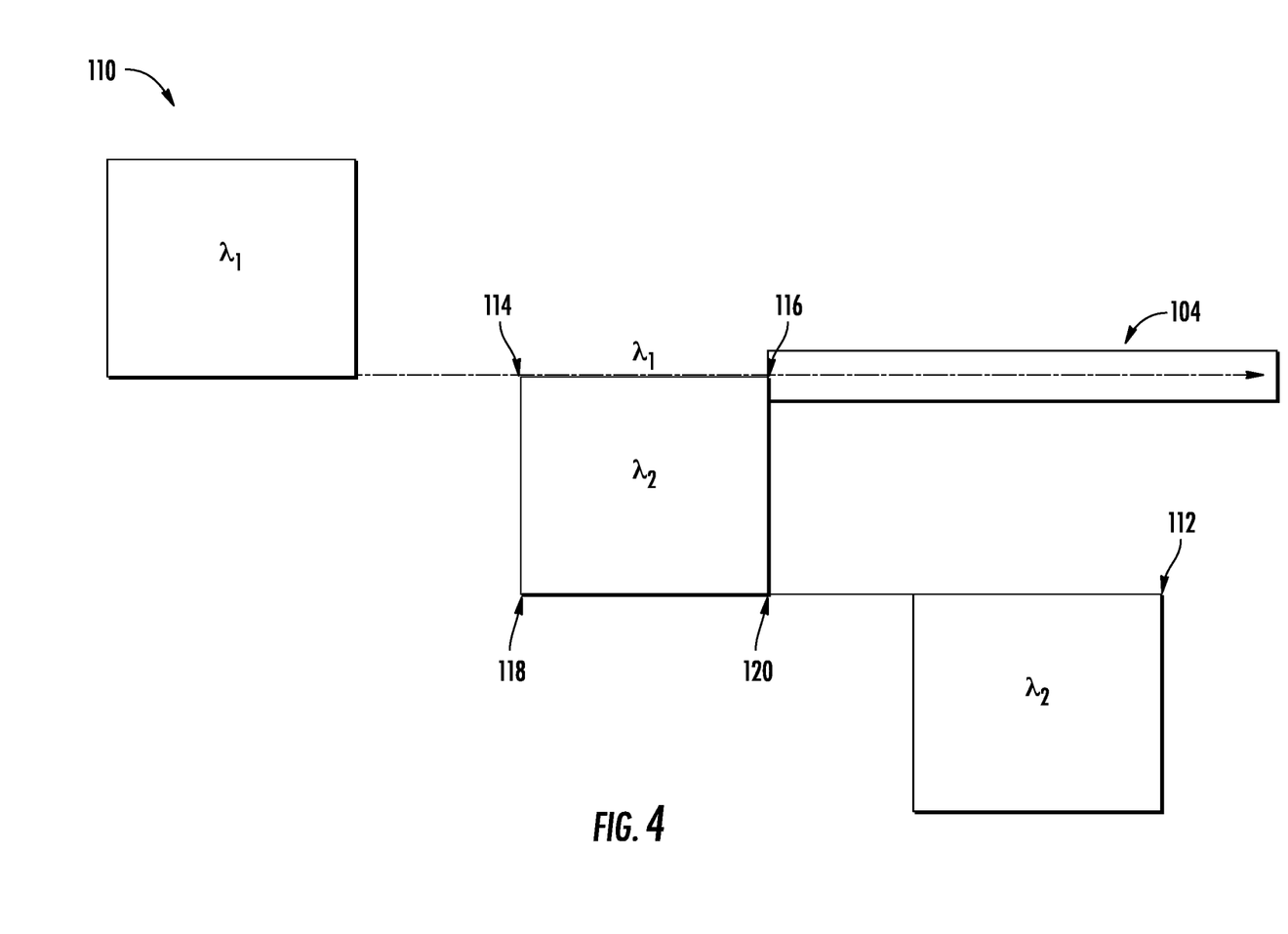
FIG. 4 illustrates operation of the first optical transmitter of the example first bi-directional optical communication module of FIG. 2 at a first wavelength in accordance with one or more embodiments of the present disclosure.

With reference to FIG. 4, operation of the module 102 in which the first optical transmitter 110 generates optical signals having the first wavelength ($\lambda_1$) is illustrated. As shown, the first band pass filter 108 may be configured to attenuate optical signals having the second wavelength ($\lambda_2$) such that optical signals that are not at the second wavelength (e.g., the first wavelength ($\lambda_1$)) pass therethrough. As such, the optical signals generated by the first optical transmitter having the first wavelength ($\lambda_1$) pass from the input port 114 to the through port 116 and into the optical communication medium 104. As described above, similar operation may occur with any port 114, 116, 118, 120 to which the first optical transmitter 110 is communicably coupled with the first band pass filter 108 (e.g., the first optical signals having the first wavelength ($\lambda_1$) would pass therethrough).

Figure 5:
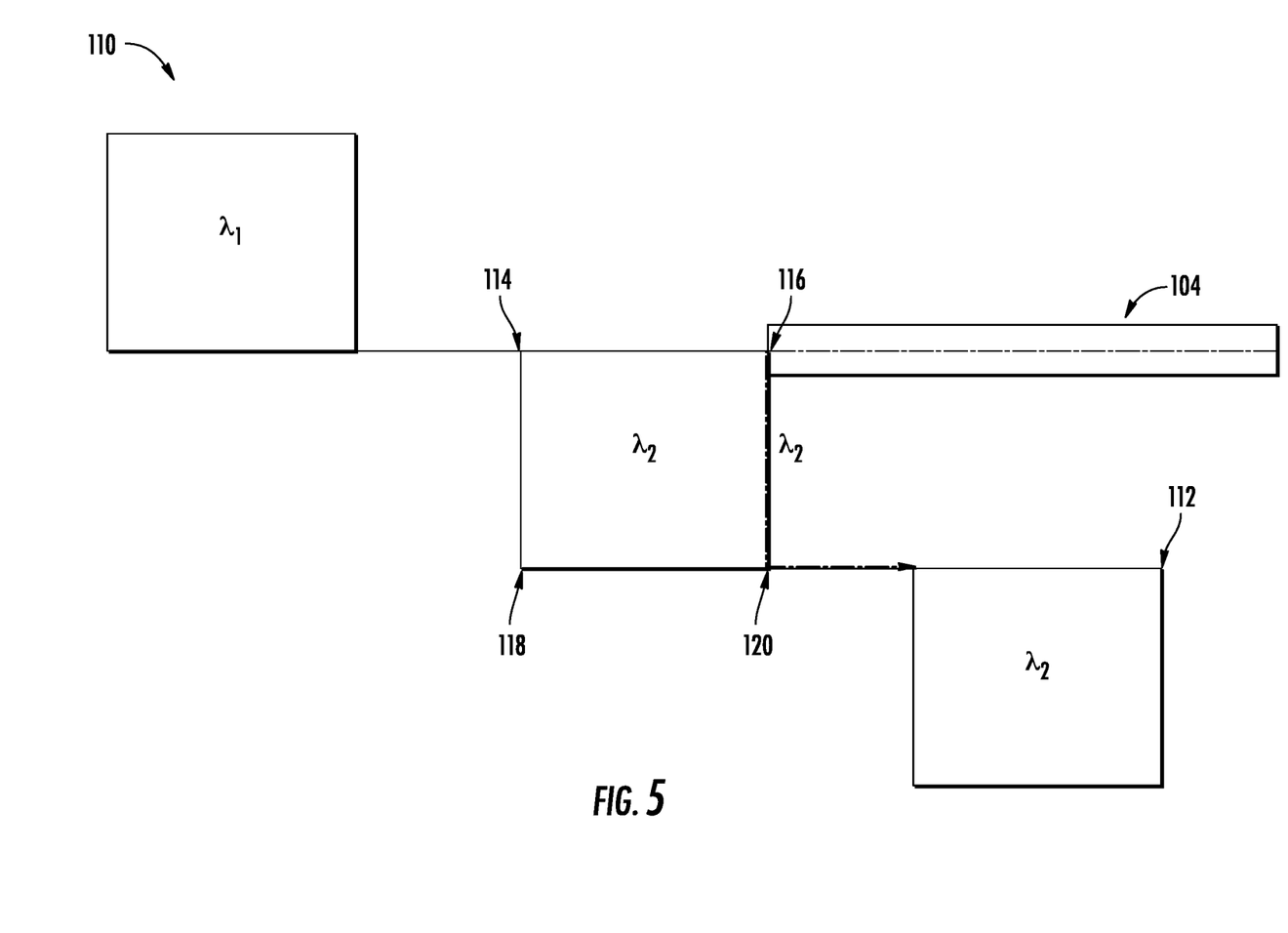
FIG. 5 illustrates operation of the first optical receiver of the example first bi-directional optical communication module of FIG. 2 at a second wavelength in accordance with one or more embodiments of the present disclosure.

With reference to FIG. 5, operation of the module 102 in which the first optical receiver 112 receives optical signals having the second wavelength ($\lambda_2$) is illustrated. As shown, the first band pass filter 108 may be configured to attenuate optical signals having the second wavelength ($\lambda_2$) such that optical signals that are at the second wavelength are redirected from the port at which the optical signals are received to the adjacent port (e.g., from input port 114 to drop port 118 or from through port 116 to add port 120). As such, the optical signals received by the first band pass filter 108 from the optical communication medium 104 having the second wavelength ($\lambda_2$) are redirected from the through port 116 to the add port 120 and into the first optical receiver 112. As described above, similar operation may occur with any port 114, 116, 118, 120 to which the first optical receiver 112 is communicably coupled with the first band pass filter 108 (e.g., the second optical signals having the second wavelength ($\lambda_2$) would be redirected)

In doing so, the first bi-directional optical communication module 102 may provide for bi-directional optical communication via the optical communication medium 104 not found in traditional solutions. For example, the optical communication medium 104 may configured to transmit optical signals having the first wavelength ($\lambda_1$) and the second wavelength ($\lambda_2$). As such, optical signals having the first wavelength ($\lambda_1$) and optical signals having the second wavelength ($\lambda_2$) may be transmitted simultaneously by the optical communication medium 104 to allow for bi-directional optical communication substantially reducing (e.g., by at least a factor of two) the routing burdens associated with conventional systems.

Figure 6:
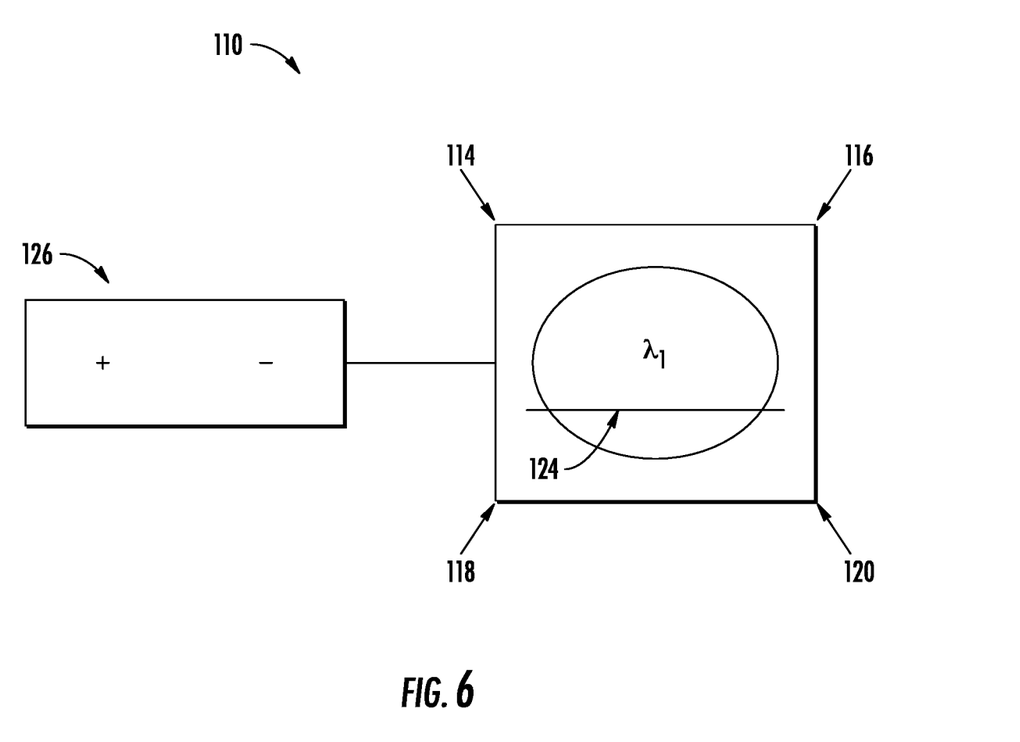
FIG. 6 illustrates an example instance in which the first optical transmitter includes a second band pass filter to facilitate generation of optical signals in accordance with one or more embodiments of the present disclosure.

With reference to FIG. 6, an example instance in which the first optical transmitter 110 includes a second band pass filter to facilitate generation of optical signals is illustrated. As shown, the first optical transmitter 110 may, in some instances, include a voltage source 126 coupled with the first optical transmitter and a wavelength modification element 124. The wavelength modification element may be a resistor, diode, and/or the like that may operate to selectively modify a material index of the second band pass filter operating as the first optical transmitter 110. For example, the wavelength modification element 124 may locally modify the temperature of the second band pass filter so as to modify the material index of the second band pass filter to modify the wavelength at which the second band pass filter attenuates optical signals. In doing so, the second band pass filter operating as the first optical transmitter 110 may encode data in the first wavelength (e.g., by selectively passing signals having the first wavelength).

Figure 7:
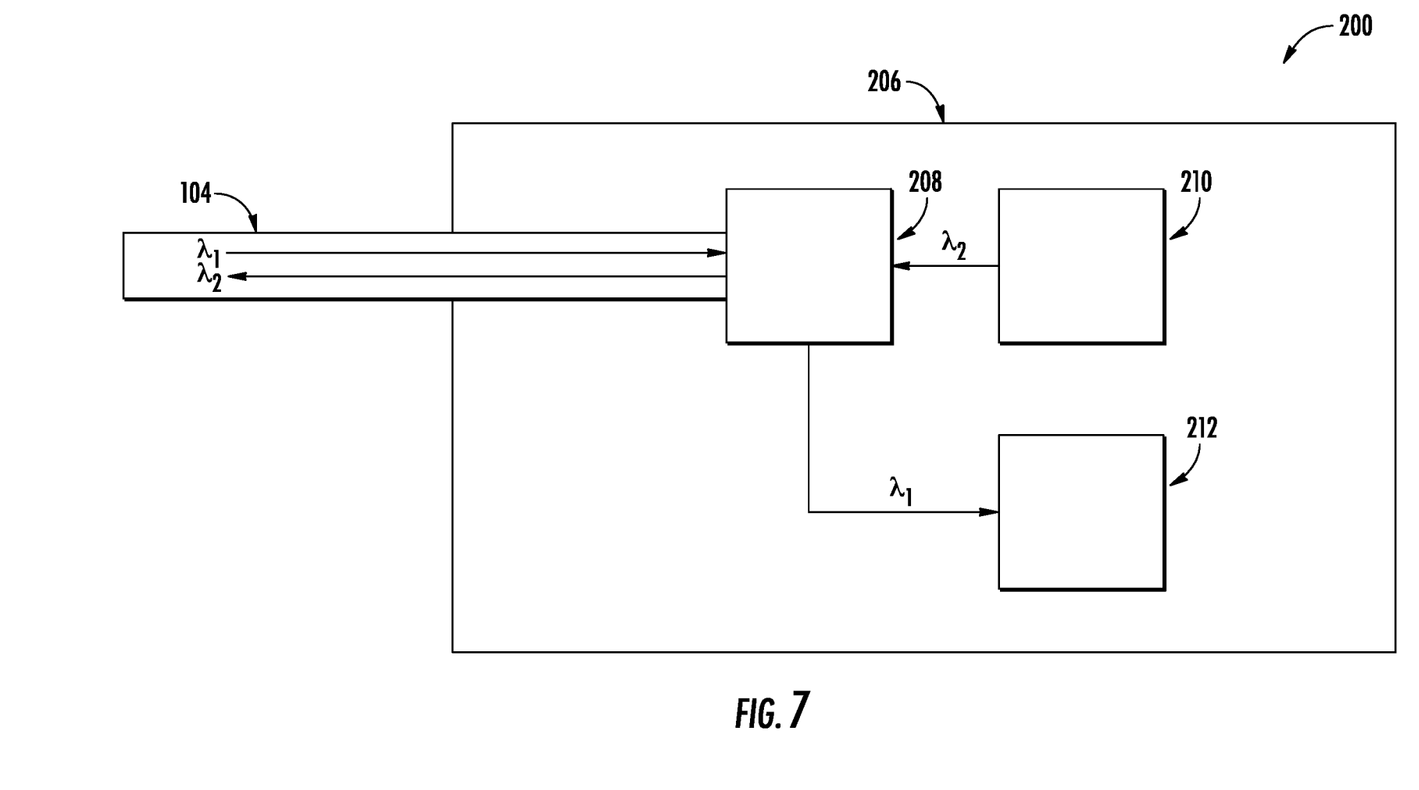
FIG. 7 illustrates an example second bi-directional optical communication module in accordance with one or more embodiments of the present disclosure.

With reference to FIG. 7, an example second bi-directional optical communication module 200 (e.g., module 200) is illustrated. As shown, the second module 200 may include a substrate 206, a third band pass filter 208, a second optical transmitter 210, and a second optical receiver 212 that may each be supported by the substrate 206. The substrate 206 may, for example, be a printed circuit board (PCB) or other equivalent support structure compatible with operation of opto-electronic components. As such, the substrate 206 may define or more electrical traces, wires, etc. configured to establish electrical communication between the opto-electronic components described herein. Although illustrated herein as a generally planar substrate 206, the present disclosure contemplates that the dimensions (e.g., size and/or shape) of the substrate 206 may vary based on the intended application of the module 200 and may, in some embodiments, refer to a plurality of substrates that are, for example, attached so as to collectively support the components described herein.

The second optical transmitter 210 may be supported by the substrate 206 and configured to generate optical signals. As described herein, the second optical transmitter 210 may be configured to generate optical signals having a second wavelength ($\lambda_2$) for transmission via the optical communication medium 104 for receipt by a corresponding optical receiver (e.g., first optical receiver 112) communicably coupled with the optical communication medium 104. In some embodiments, the second optical transmitter 210 may be a vertical-cavity surface-emitting laser (VCSEL) configured to generate optical signals having a second wavelength ($\lambda_2$). Although described with reference to a VCSEL based implementation of the second optical transmitter 210, the present disclosure contemplates that any device capable of generating optical signals may be used by the module 200. As described hereinafter with reference to FIG. 11, in some embodiments, the second optical transmitter may include a band pass filter (e.g., a fourth band pass filter 210) that may be used to selectively generate optical signals.

The second optical receiver 212 may be supported by the substrate 206 and configured to receive optical signals. As described herein, the second optical receiver 212 may be configured to receive optical signals having a first wavelength ($\lambda_1$), such as those received from the optical communication medium 104 that are generated by a corresponding optical transmitter (e.g., first optical transmitter 110) communicably coupled with the optical communication medium 104. In some embodiments, the second optical receiver 212 may be a photodiode configured to receive optical signals having a first wavelength ($\lambda_1$). Although described with reference to a photodiode based implementation of the second optical receiver 212, the present disclosure contemplates that any device capable of receiving optical signals may be used by the module 200.

Figure 8:
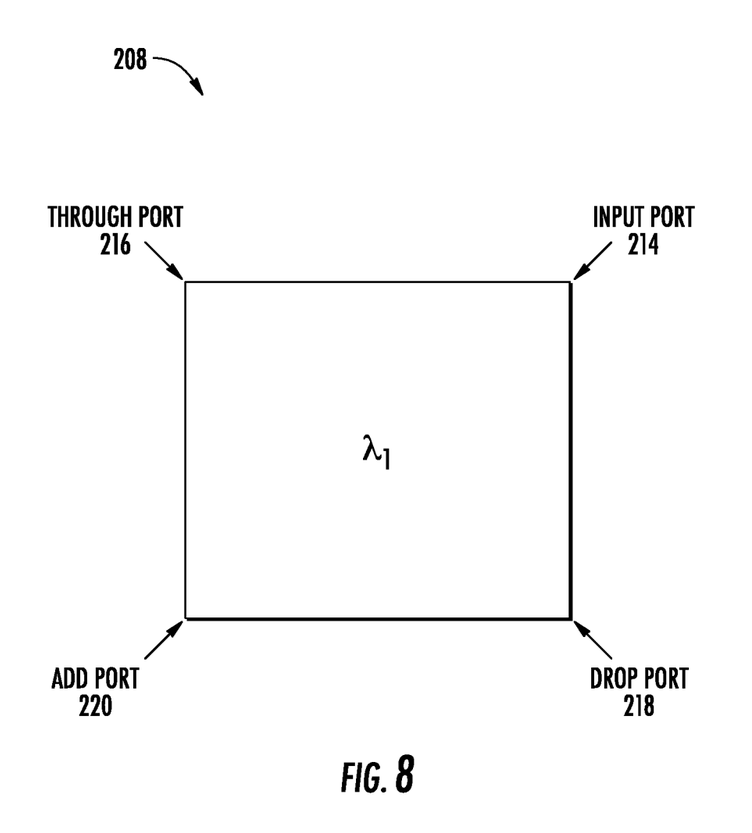
FIG. 8 illustrates an example third band pass filter of the example second bi-directional optical communication module of FIG. 7 in accordance with one or more embodiments of the present disclosure.

With reference to FIG. 8, the second bi-directional optical module 200 (e.g., module 200) may further include a third band pass filter 208, and the second optical transmitter 210 and the second optical receiver 212 may be communicably coupled with the third band pass filter 208. As described more fully hereinafter with reference to FIGS. 9-10, the third band pass filter 208 may be configured to pass optical signals received from the second optical transmitter 210 having the second wavelength ($\lambda_2$) into the optical communication medium 104 and may direct optical signals received from the optical communication medium 104 having the first wavelength ($\lambda_1$) into the second optical receiver 212.

As shown in FIG. 8, the third band pass filter 208 may include an input port 214, a through port 216, a drop port 218, and an add port 220. As would be evident to one of ordinary skill in the art in light of the present disclosure, the relative positioning between these ports 214, 216, 218, and 220 may be defined once any port is determined. Said differently, the input port 214 is disposed opposite the through port 216 and adjacent the drop port 218, and the add port is disposed opposite the drop port 218 and adjacent the through port 216 in any configuration. As a non-limiting example, the second optical transmitter 210 may be communicably coupled with the input port 214 of the third band pass filter 208, the second optical receiver 212 may be communicably coupled with the add port 220 of the third band pass filter 208, and the optical communication medium 104 may be communicably coupled with the through port 216. The third band pass filter 208 may be associated with the first wavelength ($\lambda_1$) in that the third band pass filter 208 is configured to attenuate optical signals having the first wavelength ($\lambda_1$). As would be evident to one of ordinary skill in the art in light of the present disclosure, the third band pass filter 208 may be configured to pass through optical signals having any wavelength other than the first wavelength ($\lambda_1$) while the attenuation of the optical signals having the first wavelength ($\lambda_1$) results in re-direction of the optical signal to the adjacent ports as illustrated in FIGS. 9-10.

Figure 9:
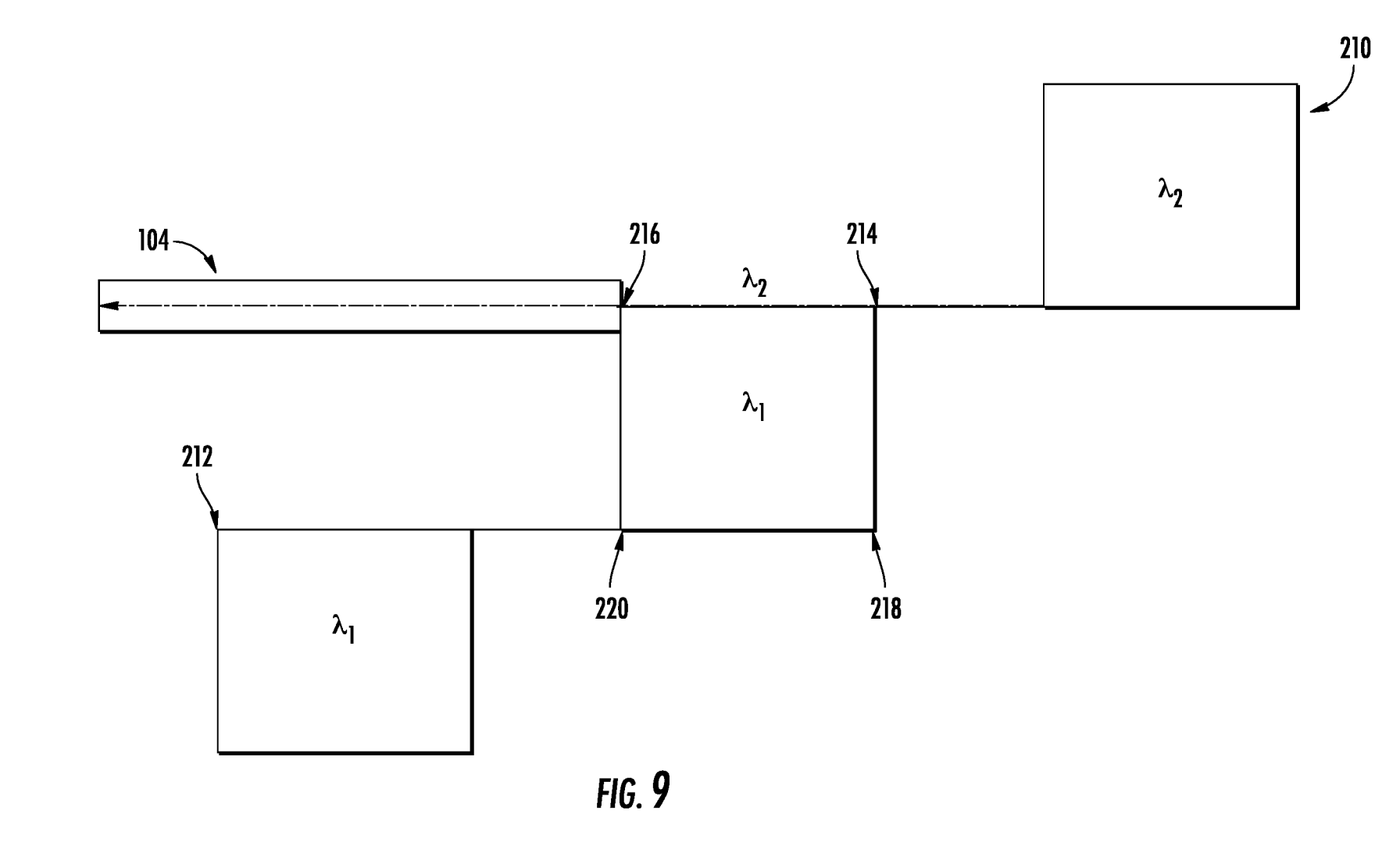
FIG. 9 illustrates operation of the second optical transmitter of the example second bi-directional optical communication module of FIG. 7 at a second wavelength in accordance with one or more embodiments of the present disclosure.

With reference to FIG. 9, operation of the module 200 in which the second optical transmitter 210 generates optical signals having the second wavelength ($\lambda_2$) is illustrated. As shown, the third band pass filter 208 may be configured to attenuate optical signals having the first wavelength ($\lambda_1$) such that optical signals that are not at the first wavelength (e.g., the second wavelength ($\lambda_2$)) pass therethrough. As such, the optical signals generated by the second optical transmitter having the second wavelength ($\lambda_2$) pass from the input port 214 to the through port 216 and into the optical communication medium 104. As described above, similar operation may occur with any port 214, 216, 218, 220 to which the second optical transmitter 210 is communicably coupled with the third band pass filter 208 (e.g., the second optical signals having the second wavelength ($\lambda_2$) would pass therethrough).

Figure 10:
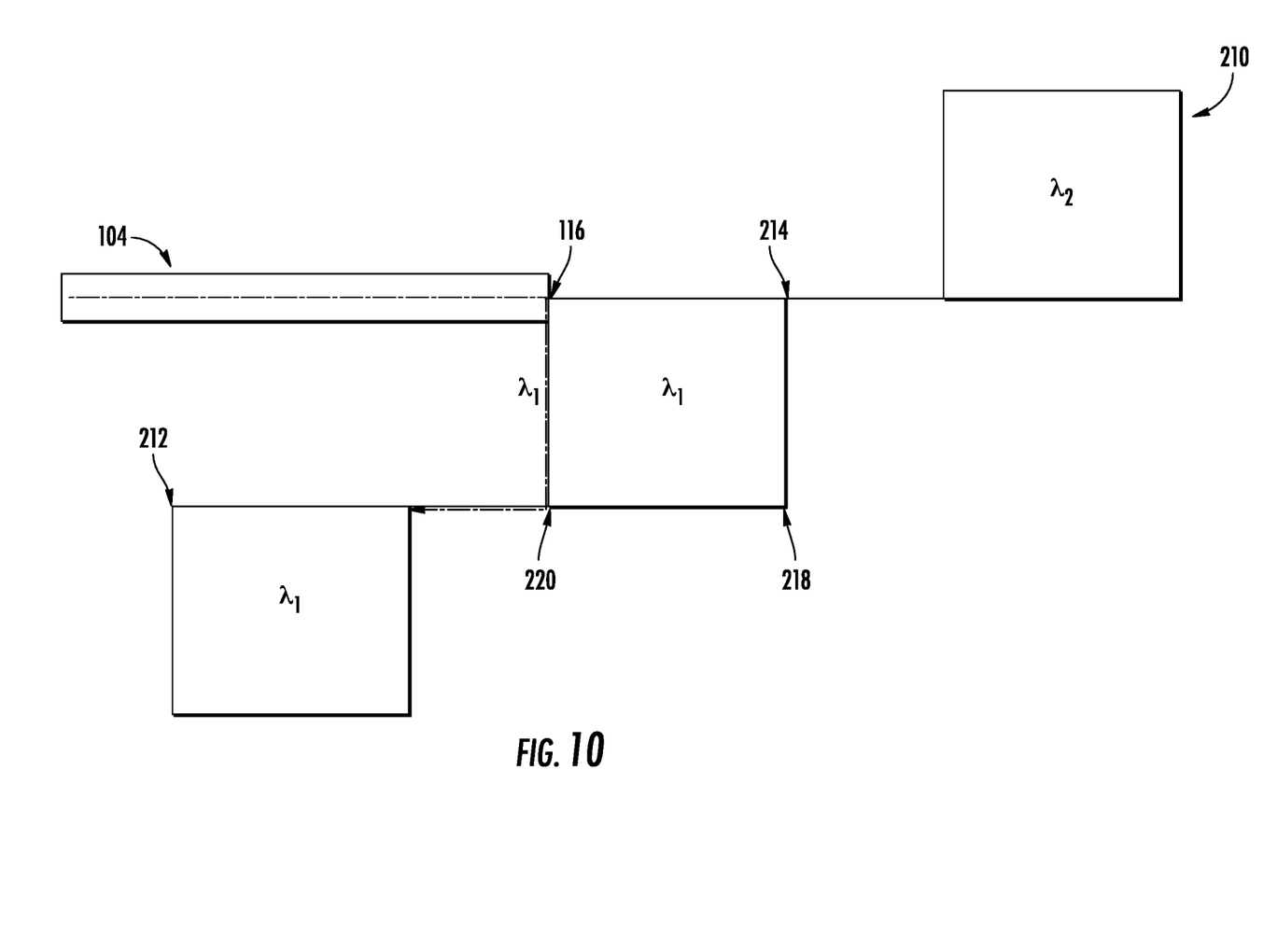
FIG. 10 illustrates operation of the second optical receiver of the example second bi-directional optical communication module of FIG. 7 at a first wavelength in accordance with one or more embodiments of the present disclosure.

With reference to FIG. 10, operation of the module 200 in which the second optical receiver 212 receives optical signals having the first wavelength ($\lambda_1$) is illustrated. As shown, the third band pass filter 208 may be configured to attenuate optical signals having the first wavelength ($\lambda_1$) such that optical signals that are at the first wavelength are redirected from the port at which the optical signals are received to the adjacent port (e.g., from input port 214 to drop port 218 or from through port 216 to add port 220). As such, the optical signals received by the third band pass filter 208 from the optical communication medium 104 having the first wavelength ($\lambda_1$) are redirected from the through port 216 to the add port 220 and into the second optical receiver 212. As described above, similar operation may occur with any port 214, 216, 218, 220 to which the second optical receiver 212 is communicably coupled with the third band pass filter 208 (e.g., the first optical signals having the first wavelength ($\lambda_1$) would be redirected)

As described above, the second bi-directional optical communication module 200 may provide for bi-directional optical communication via the optical communication medium 104 not found in traditional solutions. For example, the optical communication medium 104 may configured to transmit optical signals having the first wavelength ($\lambda_1$) and the second wavelength ($\lambda_2$). As such, optical signals having the first wavelength ($\lambda_1$) and optical signals having the second wavelength ($\lambda_2$) may be transmitted simultaneously by the optical communication medium 104 to allow for bi-directional optical communication substantially reducing (e.g., by at least a factor of two) the routing burdens associated with conventional systems.

Figure 11:
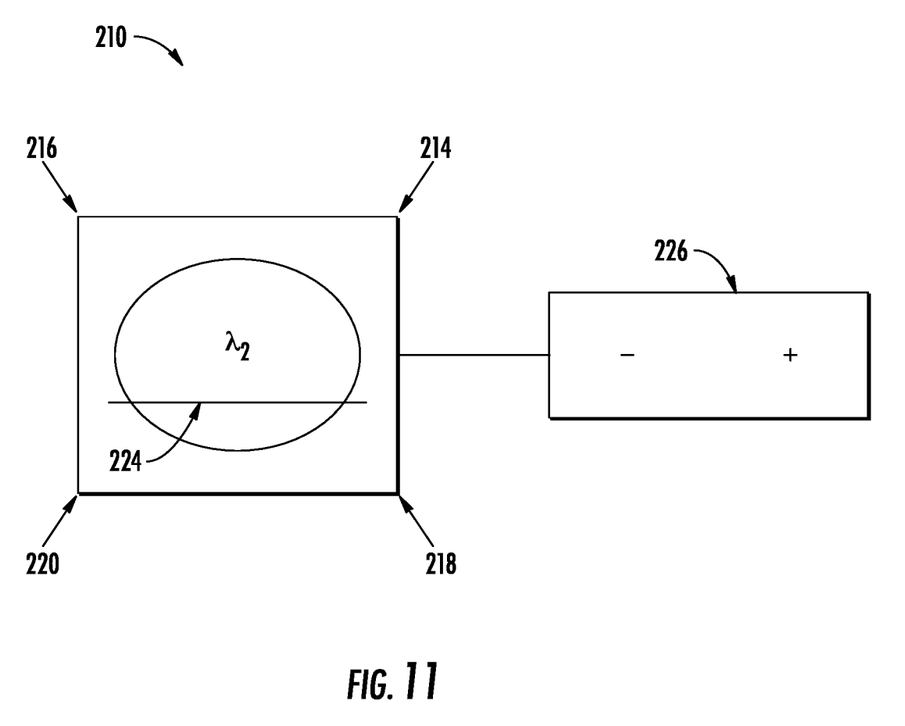
FIG. 11 illustrates an example instance in which the second optical transmitter includes a fourth band pass filter to facilitate generation of optical signals in accordance with one or more embodiments of the present disclosure.

With reference to FIG. 11, an example instance in which the second optical transmitter 210 includes a fourth band pass filter to facilitate generation of optical signals is illustrated. As shown, the second optical transmitter 210 may, in some instances, include a voltage source 226 coupled with the second optical transmitter and a wavelength modification element 224. The wavelength modification element may be a resistor, diode, and/or the like that may operate to selectively modify a material index of the fourth band pass filter operating as the second optical transmitter 210. For example, the wavelength modification element 224 may locally modify the temperature of the fourth band pass filter so as to modify the material index of the fourth band pass filter to modify the wavelength at which the fourth band pass filter attenuates optical signals. In doing so, the fourth band pass filter operating as the second optical transmitter 220 may encode data in the second wavelength (e.g., by selectively passing signals having the second wavelength).

Example Methods for Manufacturing

Figure 12:
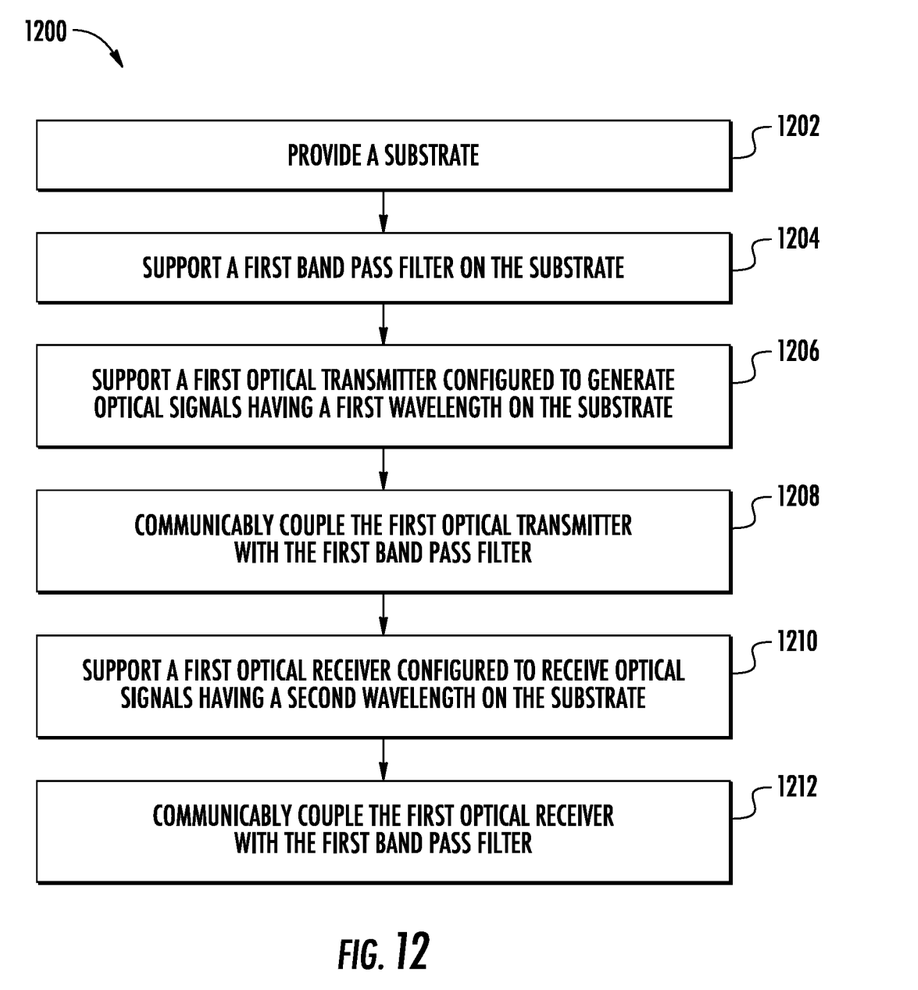
FIG. 12 illustrates an example method of manufacturing a bi-directional optical communication module in accordance with one or more embodiments of the present disclosure.

With reference to FIG. 12, an example method (e.g. method 1200) for scalable networking systems is illustrated. As shown in Block 1202, the method may include providing a substrate. As described above, the substrate may, for example, be a printed circuit board (PCB) or other equivalent support structure compatible with operation of opto-electronic components. As such, the substrate may define or more electrical traces, wires, etc. configured to establish electrical communication between the opto-electronic components described herein. Although illustrated herein as a generally planar substrate, the present disclosure contemplates that the dimensions (e.g., size and/or shape) of the substrate may vary based on the intended application of the module and may, in some embodiments, refer to a plurality of substrates that are, for example, attached so as to collectively support the components described herein.

As shown in Block 1204, the method may include supporting a first band pass filter on the substrate. As described above, the first band pass filter may be configured to pass optical signals having the first wavelength ($\lambda_1$) into an optical communication medium and may direct optical signals received from the optical communication medium having the second wavelength ($\lambda_2$). To do so, the first band pass filter may include an input port, a through port, a drop port, and an add port. As would be evident to one of ordinary skill in the art in light of the present disclosure, the relative positioning between these ports may be defined once any port is determined. The first band pass filter may be associated with the second wavelength ($\lambda_2$) in that the first band pass filter is configured to attenuate optical signals having the second wavelength ($\lambda_2$). As would be evident to one of ordinary skill in the art in light of the present disclosure, the first band pass filter may be configured to pass through optical signals having any wavelength other than the second wavelength ($\lambda_2$) while the attenuation of the optical signals having the second wavelength ($\lambda_2$) results in re-direction of the optical signal to the adjacent ports as described above.

As shown in Blocks 1206 and 1208, the method may further include supporting a first optical transmitter configured to generate optical signals having a first wavelength on the substrate and communicably coupling the first optical transmitter with the first band pass filter. As described above, the first optical transmitter may be configured to generate optical signals having a first wavelength ($\lambda_1$) for transmission via the optical communication medium for receipt by a corresponding optical receiver communicably coupled with the optical communication medium. In some embodiments, the first optical transmitter may be a vertical-cavity surface-emitting laser (VCSEL) configured to generate optical signals having a first wavelength ($\lambda_1$).

As shown in Blocks 1210 and 1212, the method may further include supporting a first optical receiver configured to receive optical signals having a second wavelength on the substrate and communicably couple the first optical receiver with the first band pass filter. As described above, the first optical receiver may be supported by the substrate and configured to receive optical signals. As described herein, the first optical receiver may be configured to receive optical signals having a second wavelength ($\lambda_2$), such as those received from the optical communication medium that are generated by a corresponding optical transmitter communicably coupled with the optical communication medium. In some embodiments, the first optical receiver may be a photodiode configured to receive optical signals having a second wavelength ($\lambda_2$).

Many modifications and other embodiments of the present disclosure will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A bi-directional optical communication module comprising:
   a substrate;
   a first band pass filter supported by the substrate;
   a first optical transmitter supported by the substrate and communicably coupled with the first band pass filter, the first optical transmitter configured to generate optical signals having a first wavelength; and
   a first optical receiver supported by the substrate and communicably coupled with the first band pass filter, the first optical receiver configured to receive optical signals having a second wavelength,
   wherein the first band pass filter comprises a wavelength modification element configured to selectively modify a material index of the first band pass filter so as to:
      pass optical signals received from the first optical transmitter having the first wavelength into an optical communication medium; and
      direct optical signals received from the optical communication medium having the second wavelength into the first optical receiver.

2. The bi-directional optical communication module according to claim 1, further comprising the optical communication medium communicably coupled with the first band pass filter.

3. The bi-directional optical communication module according to claim 2, wherein the optical communication medium is configured to transmit optical signals having the first wavelength and the second wavelength.

4. The bi-directional optical communication module according to claim 2, wherein optical signals having the first wavelength and optical signals having the second wavelength are transmitted simultaneously by the optical communication medium.

5. The bi-directional optical communication module according to claim 1, wherein the first band pass filter comprises:
   an input port, wherein the first optical transmitter is communicably coupled with the input port of the first band pass filter;
   a drop port;
   a through port; and
   an add port, wherein the first optical receiver is communicably coupled with the add port of the first band pass filter.

6. The bi-directional optical communication module according to claim 1, wherein the first optical transmitter further comprises a second band pass filter configured to selectively generate optical signals having the first wavelength.

7. The bi-directional optical communication module according to claim 6, wherein the second band pass filter operating as the first optical transmitter further comprises a wavelength modification element configured to selectively modify a material index of the second band pass filter so as output the optical signals having the first wavelength.

8. A bi-directional optical communication cable comprising:
   a first substrate;
   a first band pass filter supported by the first substrate comprising a wavelength modification element configured to selectively modify a material index of the first band pass filter;
   a first optical transmitter supported by the first substrate and communicably coupled with the first band pass filter, the first optical transmitter configured to generate optical signals having a first wavelength;
   a first optical receiver supported by the first substrate and communicably coupled with the first band pass filter, the first optical receiver configured to receive optical signals having a second wavelength,
   a second substrate;
   a band pass filter supported by the second substrate;
   a second optical transmitter supported by the second substrate and communicably coupled with the band pass filter of the second substrate, the second optical transmitter configured to generate optical signals having the second wavelength;
   a second optical receiver supported by the second substrate and communicably coupled with the band pass filter of the second substrate, the second optical receiver configured to receive optical signals having the first wavelength; and
   an optical communication medium communicably coupling the first band pass filter and the band pass filter of the second substrate.

9. The bi-directional optical communication cable of claim 8, wherein the first band pass filter is configured to:
   pass optical signals received from the first optical transmitter having the first wavelength into the optical communication medium for receipt by the second optical receiver; and direct optical signals received from the optical communication medium and generated by the second optical transmitter having the second wavelength into the first optical receiver.

10. The bi-directional optical communication cable of claim 8, wherein the band pass filter of the second substrate is configured to:
pass optical signals received from the second optical transmitter having the second wavelength into the optical communication medium for receipt by the first optical receiver; and
direct optical signals received from the optical communication medium and generated by the first optical transmitter having the first wavelength into the second optical receiver.

11. The bi-directional optical communication cable according to claim 8, wherein optical signals having the first wavelength and optical signals having the second wavelength are transmitted simultaneously by the optical communication medium.

12. The bi-directional optical communication cable according to claim 8, wherein the first band pass filter comprises:
an input port, wherein the first optical transmitter is communicably coupled with the input port of the first band pass filter;
a drop port;
a through port; and
an add port, wherein the first optical receiver is communicably coupled with the add port of the first band pass filter.

13. The bi-directional optical communication cable according to claim 8, wherein the band pass filter of the second substrate comprises:
an input port, wherein the second optical transmitter is communicably coupled with the input port of the band pass filter of the second substrate;
a drop port;
a through port; and
an add port, wherein the second optical receiver is communicably coupled with the add port of the band pass filter of the second substrate.

14. The bi-directional optical communication cable according to claim 8, wherein the first optical transmitter further comprises a second band pass filter configured to selectively generate optical signals having the first wavelength.

15. The bi-directional optical communication cable according to claim 14, wherein the second band pass filter operating as the first optical transmitter further comprises a first wavelength modification element configured to selectively modify a material index of the second band pass filter so as output the optical signals having the first wavelength.

16. The bi-directional optical communication cable according to claim 8, wherein the band pass filter of the second substrate is a third band pass filter, and the second optical transmitter further comprises a fourth band pass filter configured to selectively generate optical signals having the second wavelength.

17. The bi-directional optical communication cable according to claim 16, wherein the fourth band pass filter operating as the second optical transmitter further comprises a second wavelength modification element configured to selectively modify a material index of the fourth band pass filter so as output the optical signals having the second wavelength.

18. A method of manufacturing a bi-directional optical communication module, the method comprising:
providing a substrate;
supporting a first band pass filter on the substrate;
supporting a first optical transmitter configured to generate optical signals having a first wavelength on the substrate;
communicably coupling the first optical transmitter with the first band pass filter;
supporting a first optical receiver configured to receive optical signals having a second wavelength on the substrate;
communicably coupling the first optical receiver with the first band pass filter,
wherein the first band pass filter comprises a wavelength modification element configured to selectively modify a material index of the first band pass filter so as to:
pass optical signals received from the first optical transmitter having the first wavelength into an optical communication medium; and
direct optical signals received from the optical communication medium having the second wavelength into the first optical receiver.

19. The method according to claim 18, wherein optical signals having the first wavelength and optical signals having the second wavelength are transmitted simultaneously by the optical communication medium.

20. The method according to claim 18, wherein the first band pass filter comprises:
an input port, wherein the first optical transmitter is communicably coupled with the input port of the first band pass filter;
a drop port;
a through port; and
an add port, wherein the first optical receiver is communicably coupled with the add port of the first band pass filter.

* * * * *